(12) United States Patent
Khosravi et al.

(10) Patent No.: US 10,581,617 B2
(45) Date of Patent: Mar. 3, 2020

(54) METHOD AND APPARATUS FOR HARDWARE BASED FILE/DOCUMENT EXPIRY TIMER ENFORCEMENT

(71) Applicant: McAfee, LLC, Santa Clara, CA (US)

(72) Inventors: Hormuzd M. Khosravi, Portland, OR (US); Alex Nayshtut, Gan Yavne (IL); Igor Muttik, Aylesbury (GB)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 14/757,600

(22) Filed: Dec. 23, 2015

(65) Prior Publication Data
US 2017/0185789 A1   Jun. 29, 2017

(51) Int. Cl.
   *H04L 9/32*   (2006.01)
(52) U.S. Cl.
   CPC .................. *H04L 9/3263* (2013.01)
(58) Field of Classification Search
   CPC ............. G06F 21/6218; G06F 21/6209; G06F 2221/2137; H04L 9/083; H04L 9/3263; H04L 63/068; H04L 63/0435; H04L 63/108; H04L 63/0823; H04L 67/1097
   See application file for complete search history.

(56) References Cited

U.S. PATENT DOCUMENTS

| 9,852,299 | B2 | 12/2017 | Nellitheertha et al. | |
| 2005/0229004 | A1* | 10/2005 | Callaghan | G06F 21/33 713/185 |
| 2009/0210700 | A1* | 8/2009 | Nomura | G06F 21/62 713/155 |
| 2012/0310882 | A1* | 12/2012 | Werner | H04L 67/1095 707/624 |
| 2014/0089204 | A1 | 3/2014 | Spies et al. | |
| 2014/0164774 | A1* | 6/2014 | Nord | G06F 21/602 713/171 |
| 2015/0186657 | A1 | 7/2015 | Kakhjiri | |
| 2015/0365385 | A1 | 12/2015 | Hore | |

(Continued)

FOREIGN PATENT DOCUMENTS

| WO | 2015-047285 | 4/2015 |
| WO | 2015-154720 | 10/2015 |

OTHER PUBLICATIONS

International Searching Authority, "International Search Report and Written Opinion," issued in connection with application No. PCT/US2016/063020, dated Mar. 9, 2017, 18 pages.

(Continued)

*Primary Examiner* — Maung T Lwin
*Assistant Examiner* — Suman Debnath
(74) *Attorney, Agent, or Firm* — Hanley, Flight & Zimmerman, LLC

(57) ABSTRACT

A technique for secure network storage includes generating, by a trusted execution environment in a first device, an encryption key and a certificate for a document, wherein the certificate comprises expiry information for the document and the encryption key, encrypting, by a general execution environment in the first device, the document with the encryption key, transmitting the encryption key to a remote key manager, and transmitting the document to a remote network storage device, wherein a second device is allowed to decrypt the document based on the expiry information.

15 Claims, 6 Drawing Sheets

(56) References Cited

U.S. PATENT DOCUMENTS

2016/0188894 A1* 6/2016 Factor .................. G06F 21/6218
713/165
2016/0321461 A1* 11/2016 Oliver .................. G06F 11/1004

OTHER PUBLICATIONS

International Bureau of WIPO, "International Preliminary Report on Patentability," issued in connection with application No. PCT/US2016/063020, dated Jul. 5, 2018, 15 pages.

* cited by examiner

METHOD AND APPARATUS FOR HARDWARE BASED FILE/DOCUMENT EXPIRY TIMER ENFORCEMENT

TECHNICAL FIELD

Embodiments described herein generally relate to file security, and more particularly to providing hardware based file expiry timer enforcement.

BACKGROUND ART

Today's computer networks consist of many computing devices exchanging data and interacting with each other. One issue benefit of computer networks is the ability to store files and documents remotely in network storage, such as cloud storage. In recent years, cloud storage has become incredibly useful for users who want to access data on multiple devices. As an example, in a business environment, corporate users often want to back up data to cloud storage, and access the data from multiple devices.

One issue that arises is security of the files. Storing data remotely inherently comes with the risk that it is accessed without authorization. Users must be able to trust cloud storage providers to keep their files secure. In fields such as law or medicine, the security of the data is of utmost importance. Thus, a solution is needed to allow users to manage data security and still access data at multiple devices.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computer system" can refer to a single computer or a plurality of computers working together to perform the function described as being performed on or by a computer system.

As used herein, the term "network device" can refer to any computer system that is capable of communicating with another computer system across any type of network.

As used herein, the term "trusted execution environment" may refer to an isolated execution environment that provides a secured execution space and can communicate with other trusted execution environments in remote devices.

In one or more embodiments, a technique is provided for providing peer-to-peer group vigilance. In one or more embodiments, providing peer-to-peer group vigilance includes providing network security using group-based trust. A trusted network device may determine a trust score for a network device, either the local device, or a remote device, based on locally collected data as well as trust data received from other devices in the network. The trusted network may identify problematic devices based on the collected trust data, and cause the problematic device to restrict its activities.

Figure 1:
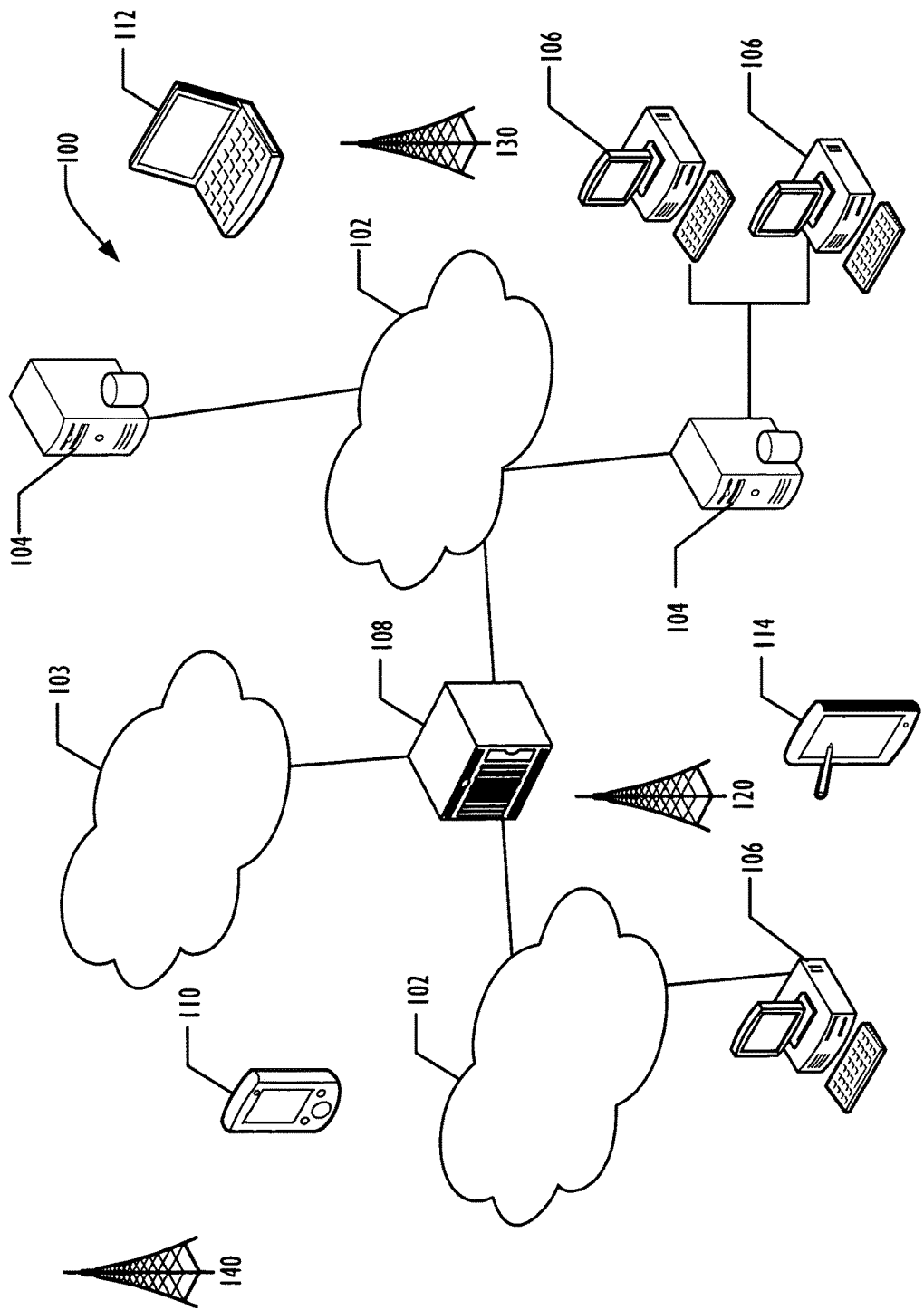
FIG. 1 is a diagram illustrating a network of programmable devices according to one or more embodiments.

Referring to the figures, FIG. 1 an example infrastructure 100 in which embodiments may be implemented is illustrated schematically. Infrastructure 100 contains computer networks 102. Computer networks 102 may include many different types of computer networks available today, such as the Internet, a corporate network, or a Local Area Network (LAN). Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Each of the networks 102 may contain a number of other devices typically referred to as Internet of Things (microcontrollers, embedded systems, industrial control computing modules, etc.). Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services. The functionality of the gateway device 108 may be implemented in any device or combination of devices illustrated in FIG. 1.

In one or more embodiments, one or more of the devices connected across network 102 may support trusted operations through the employment of a trusted execution environment (TEE). Devices in the network that support trusted operations may be referred to as trusted network devices. Trusted networks may be formed dynamically using trusted discovery which allows trusted network devices to discover other trusted network devices, or trusted network nodes, that include a trusted entity. One example is the inclusion of Intel® Manageability Engine which is available from the Intel Corporation. (INTEL is a registered trademark of Intel Corporation.) For purposes of the current disclosure, trusted networks may be formed by any means that allow services on trusted devices to remain opaque to network devices that are not part of the trusted network. Whereas untrusted discovery may reveal whether a particular node or network device may support trusted discovery, trusted discovery may be necessary to reveal additional trusted capabilities and services among trusted devices. Some examples of protocols that may be revealed only by trusted discovery include attestation, key agreement, group formation, trusted proxy, and provisioning.

Hardware-based expiry timer enforcement utilizes a hardware-based approach to enforce expiration information. In one or more embodiments, a key and a certificate including the key may be generated in a trusted execution environment (TEE). The certificate may also include expiration information for the encrypted document. A file or document may be encrypted with the key, and the encrypted document or file may be stored in cloud storage, which the certificate, with the key, may be stored in a secure network storage.

Figure 2:
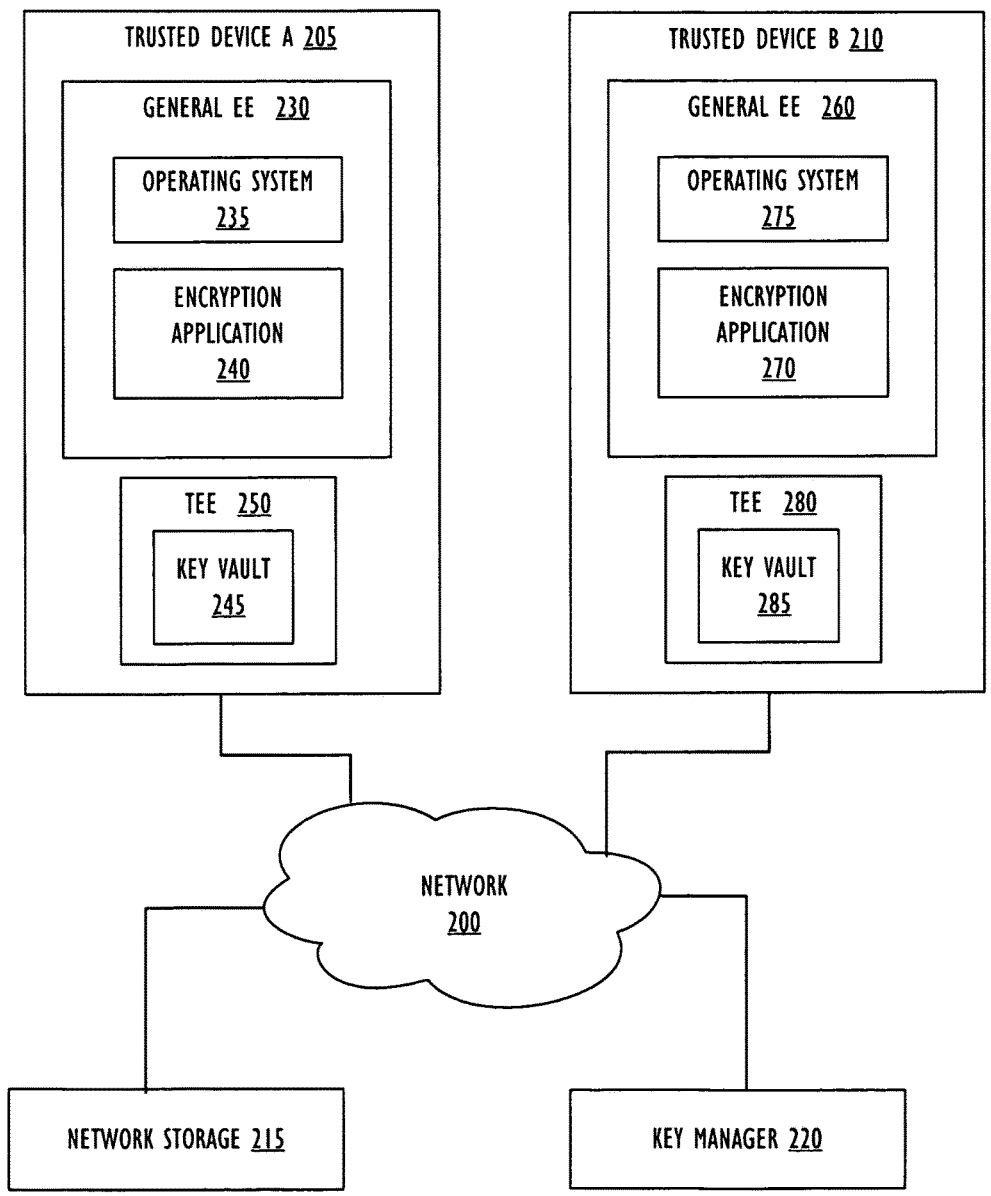
FIG. 2 is a diagram illustrating a system for hardware-based expiry timer enforcement in a network according to one or more embodiments.

FIG. 2 is a diagram illustrating a system for hardware-based expiry timer enforcement in a network according to one or more embodiments. FIG. 2 includes four devices, including trusted device A 205, trusted device B 210, network storage 215 and key manager 220, connected across network 200. Network 200 may be any type of computer network, such as a LAN or a corporate network. For example, Network 200 may include a subset of the devices included in larger network 102 or 103.

Each of trusted device 205 and 210 includes a trusted execution environment 250 and 280, as well as a general execution environment 230 and 260. In one or more embodiments, the TEEs are isolated execution environments separate from the general execution environment. The execution space of the TEE may provide a higher level of security than a general execution environment. The TEE may include a separate processor than that of the general execution environment 230, and may include its own memory.

Each trusted device A 205 and trusted device B 210 includes a general execution environment 230 and 260. General execution environments 230 and 260 may each include an operating system 235 and 275, and an encryption application 240 and 270. In one or more embodiments, operating system 235 may be configured to manage execution of applications running in the general execution environment 230, such as the encryption application 240. In one or more embodiments, the encryption application 240 and 270 may encrypt or decrypt files using encryption keys.

In one or more embodiments, encryption keys may be generated within the trusted execution environment 250. For example, the encryption keys may be generated within the key vault 245. The encryption key may be data specific. For example, in one or more embodiment, the encryption key may be generated for a particular file or document. In one or more embodiments, the encryption application 240 may encrypt a file, document, or other data, using the key. In one or more embodiments, the encryption key may be received from the trusted execution environment 250. The key may also be included in a certificate, which may be generated by the TEE 250, for example in the key vault 245.

Running alongside execution environment 230 is trusted execution environment (TEE) 250. TEE 250 may provide services that are used to generate keys and also certificates associated with various files, documents, and other data being encrypted by the encryption application 240. In one or more embodiments the encryption key may be data specific. For example, in one or more embodiment, the encryption key may be generated for a particular file or document.

Trusted device A 205 may store the encrypted file in network storage 215. In one or more embodiments, network storage 215 may be hosted by a cloud storage service. Further, cloud storage 215 may include a single storage system, or multiple storage systems. Trusted device A 205 may store the certificate in a key manager 220. In one or more embodiments, the key manager 220 may be a network device or devices that are managed by a third party. For example, key manager 220 may be an enterprise key manager. Further, in one or more embodiments, key manager 220 may be managed by an IT specialist or group. In one or more embodiments, the key manager manages security for the encryption system. For example, in one or more embodiments, the key manager 220 may communicate with the TEE 250 to manage expiry information associated with an encrypted document, such as managing expiry information for encrypted documents. The key manager 220 may store keys and certificates identified by a key ID. Expiry information may include, for example, timer information indicating a time period for which the key in the certificate is valid to decrypt the encrypted document.

In order to obtain the document once it is encrypted in network storage 215, another trusted device, such as trusted device B 210 may request the document or file from network storage 215. The encrypted document will be associated with, include, or otherwise identify a document ID that indicates the certificate corresponding to the document. In one or more embodiments, trusted device B 210 may request the certificate from key manager 220. The certificate may be requested using the document ID.

In one or more embodiments, key vault 285 may determine whether the encrypted document may be decrypted. In one or more embodiments, the key vault 285 may determine whether the encrypted document may be decrypted based on expiry information in the certificate In one or more embodiments, trusted device B 210 may identify timer information in the certificate and use a system clock to determine whether the certificate has expired. In one or more embodiments, the system clock may be part of the TEE 280. Utilizing a system clock that is part of the TEE 280 may provide a higher level of security than a system clock in the general execution environment 260 because of the secure environment.

Figure 6:
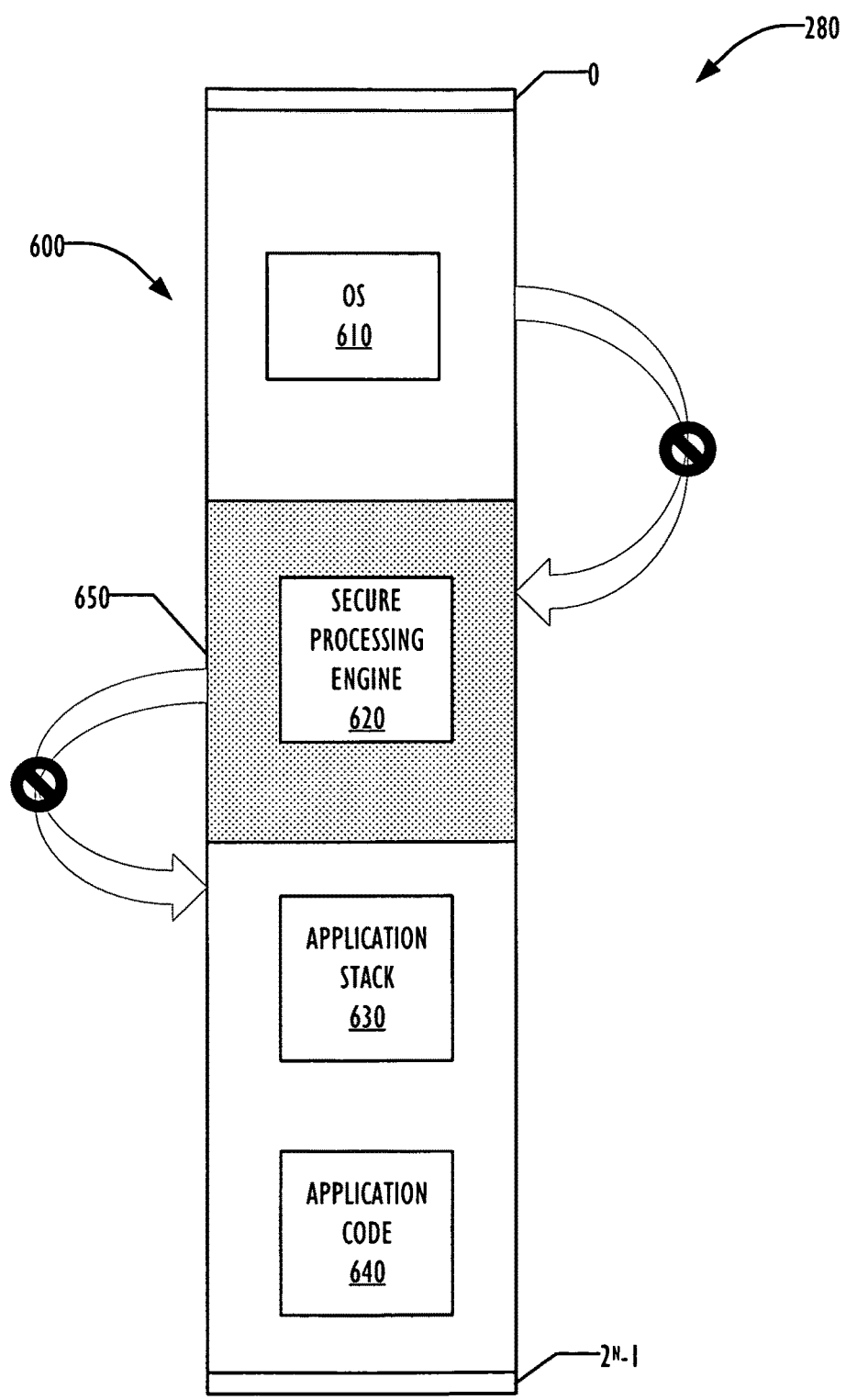
FIG. 6 is a block diagram illustrating a secure enclave according to one embodiment.

In one or more embodiments, trusted device B 210 may employ a TEE 280 that is a secure enclave such as provided for by, for example, Intel Software Guard Extension (SGX). FIG. 6 is a block diagram illustrating an enclave-based trusted execution environment (TEE) 280 according to one embodiment.

In the example of FIG. 6, memory 600 is addressable by n-bits, ranging in address from 0 to $2^n-1$. Within memory 600 is an operating system 610, enclave 650, application stack 630, and application code 640.

In this example, enclave 650 is a specially-designated portion of memory 600 that cannot be entered into or exited from except via special instructions, such as Intel SGX or similar. Enclave 650 is provided as an example of a secure environment which, in conjunction with a secure processing engine 620, forms a trusted execution environment (TEE) 280 on trusted device 210. By way of example, TEE 280 may include memory enclave 650 or some other protected memory area, and a secure processing engine 620, which includes hardware, software, and instructions for accessing and operating on enclave 650. Non-limiting examples of solutions that either are or that can provide a TEE include Intel SGX, ARM TrustZone, AMD Platform Security Processor, Kinibi, securiTEE, OP-TEE, TLK, T6, Open TEE, and SierraTEE, CSE, VT-x, MemCore, Canary Island, Docker, and Smack. Thus, it should be noted that in an example, secure processing engine 620 may be a user-mode application that operates via a trusted execution framework within enclave 650. TEE 280 may also conceptually include processor instructions that secure processing engine 620 and the trusted execution framework required to operate within enclave 650.

Secure processing engine 620 and the trusted execution framework may together form a trusted computing base (TCB), which is a set of programs or computational units that are trusted to be secure. Conceptually, it may be advantageous to keep the TCB relatively small so that there are fewer attack vectors for malware objects or for negligent software. Thus, for example, operating system 610 may be excluded from the TCB, in addition to the regular application stack 630 and application code 640.

In certain systems, computing devices equipped with the Intel SGX or equivalent instructions may be capable of providing an enclave 650. It should be noted however, that many other examples of TEEs are available, and the TEE 280 of FIG. 6 is provided only as one example thereof. Other secure environments may include, by way of nonlimiting example, a virtual machine, sandbox, testbed, test machine, or other similar device or method for providing a TEE 280.

In an example, enclave 650 provides a protected memory area that cannot be accessed or manipulated by ordinary computer instructions. Enclave 650 is described with particular reference to an Intel SGX enclave by way of example, but it is intended that enclave 650 encompass any secure processing area with suitable properties, regardless of whether it is called an "enclave."

One feature of an enclave is that once an enclave region 650 of memory 600 is defined, as illustrated, a program pointer cannot enter or exit enclave 650 without the use of special enclave instructions or directives, such as those provided by Intel SGX architecture. For example, SGX processors provide the ENCLU[EENTER], ENCLU[ERESUME], and ENCLU[EEXIT] instructions. These are the only instructions that may legitimately enter into or exit from enclave 650.

Thus, once enclave 650 is defined in memory 600, a program executing within enclave 650 may be safely verified not to operate outside of its bounds. This security feature means that secure processing engine 610 is verifiably local to enclave 650. Thus, the result of processing within enclave 650 is verified as secure.

Enclave 650 may also digitally sign its output, which provides a verifiable means of ensuring that content has not been tampered with or modified since being processed by secure processing engine 620. A digital signature provided by enclave 650 is unique to enclave 650 and is unique to the hardware of the device hosting enclave 650.

A secure enclave may therefore allow for secure utilization of resources found in the general execution environment 260. Thus, trusted device B 210 may determine whether the file or document may be decrypted based on the expiry information using a secure enclave to interface with a system clock secured by the TEE 280. In one or more embodiments, trusted device B 210 may alternatively obtain a trusted signed timestamp from an external source in order to determine whether the encrypted document may be decrypted based on the expiry information. The encryption application 270 may decrypt the encrypted document if decryption is allowed based on the expiry information in the certificate.

Figure 3:
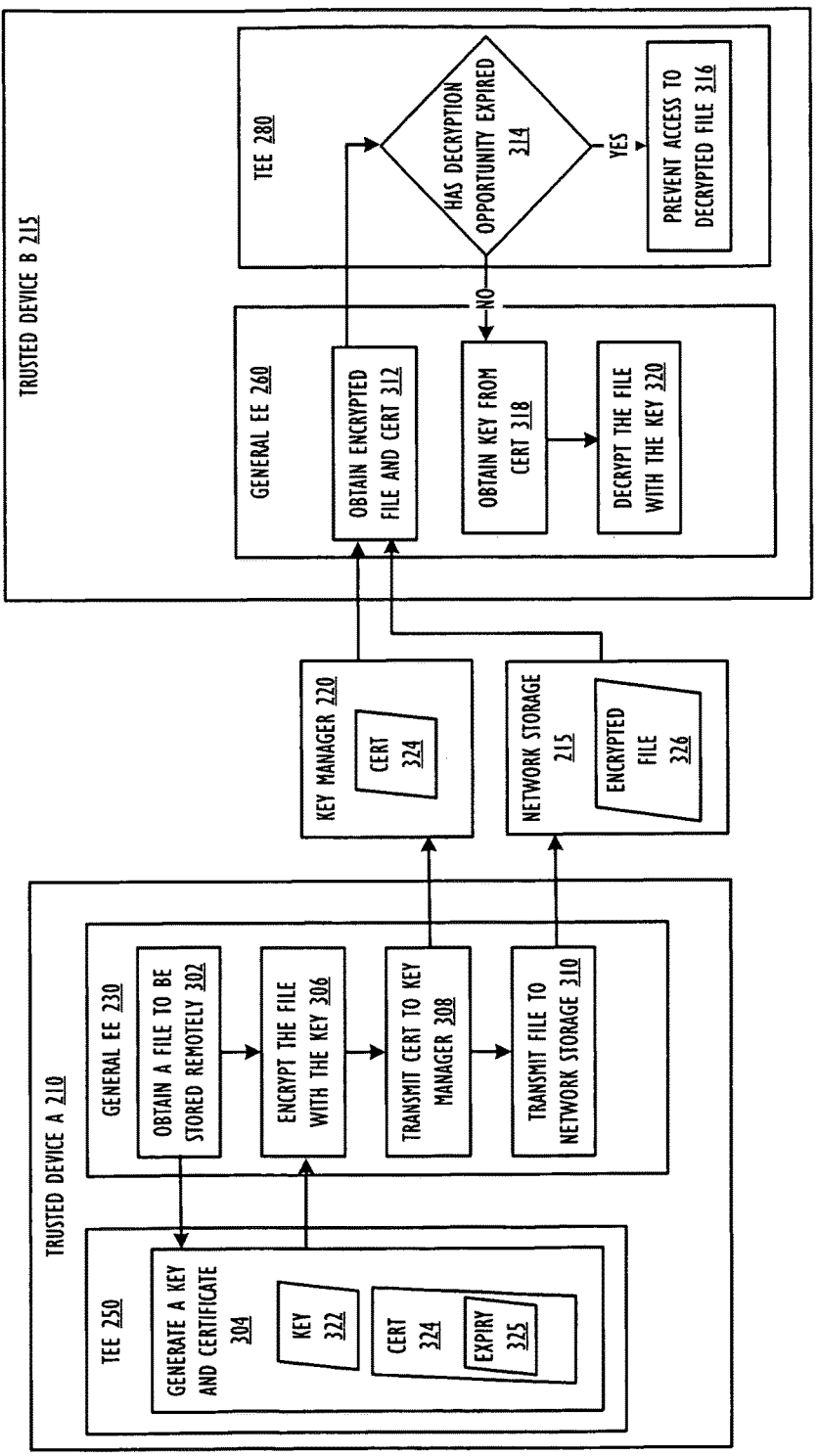
FIG. 3 is a flow diagram illustrating a technique for securely storing and accessing data in cloud storage, according to one or more embodiments.

FIG. 3 is a flow diagram illustrating a technique for securely storing and accessing data in cloud storage, according to one or more embodiments. The flow diagram shows trusted device A 210 securely storing a file to network storage 215 and a certificate to a key manager 220, and trusted device B 215 obtaining a decrypted version of the document.

The method begins at 302, where trusted device A 205 obtains a file to be stored remotely. In one or more embodiments, the file may be a document or any other data to be stored in remote storage. The file may be created locally on trusted device A 210, or may be obtained from an external source. Then, at 304, a key 322 and a certificate 324 are generated for the file. In one or more embodiments, the key and certificate are generated within TEE 250. The certificate and the key may be file specific. In one or more embodiments, the certificate includes expiry information 325. The expiry information may be determined, for example, a time period for which an encrypted document may be decrypted. Alternatively or additionally, the expiry information may indicate an expiration date or time after which the encrypted document cannot be decrypted. The expiry information may be determined externally, for example through an IT policy directed from the key manager 205. In one or more embodiments, the expiry information may be set based on a clock in the TEE 250.

The flow diagram continues at 306 and the file is encrypted with the generated key 322. In one or more embodiments, the file may be encrypted within the general execution environment 230. In one or more embodiments, the file may be associated with a document identification. That is, an identification may be incorporated into the encrypted file, or associated with the encrypted file, such that the corresponding certificate for the file may be identified. The flow diagram continues at 308 and the certificate 324 is transmitted to the key manager 220. At 310, trusted device A 210 transmits the encrypted file 326 to network storage 215. Thus, in one or more embodiments, the provider of network storage 215, such as a cloud storage service, stores the encrypted file without the ability to decrypt the file.

The flow diagram also shows trusted device B 215 obtaining and decrypting the encrypted file from network storage 215. At 312, trusted device B 215 obtains the encrypted file 326 from network storage 215, and the certificate 324 for the encrypted file 326 from the key manager 220. In one or more embodiments, the encrypted file 326 and the certificate 324 may be obtained in the general execution environment 260 of trusted device B 215. Trusted device B 215 may obtain the encrypted file 326 and identify a file ID that indicates the certificate 324 to be obtained from key manager 220. In one or more embodiments, the certificate 324 and the encrypted file 326 may be obtained in the general execution environment 260 of trusted device B 215.

The flow diagram continues at 314, and a determination is made regarding whether the decryption opportunity has expired. In one or more embodiments, the determination may be made in the TEE 280 of trusted device B 215. The TEE 280 may determine if the decryption opportunity has expired based on expiry information in the certificate 324. The TEE 280 may consult a trusted system clock in the TEE 280 to determine if the time period during which the file may be decrypted has expired. Alternatively, although not depicted, a secure enclave in trusted device B 215 may determine whether the decryption opportunity has expired from a secure enclave. A secure enclave in trusted device B 215 may interface with a system clock in TEE 280 to determine whether the decryption opportunity has passed. Further, in one or more embodiments, trusted device B 215 may obtain a secure timestamp from an external source to determine whether the decryption opportunity has passed. In one or more embodiments, the TEE 280 may determine o the decryption opportunity has passed by accessing a timetable or rules in the certificate. If, at 314 it is determined that the decryption opportunity has expired, then the flow diagram continues at 316 and access to the decrypted file is prevented. In one or more embodiments, access is prevented by removing certificate 324 from the key manager 220 which may be done even before a pre-defined expiration time specified in the certificate.

Returning to 314, if it is determined that the decryption opportunity has not expired, then the flow diagram continues at 318 and the key is obtained from the certificate. Then at 320 the file is decrypted with the key.

Figure 4:
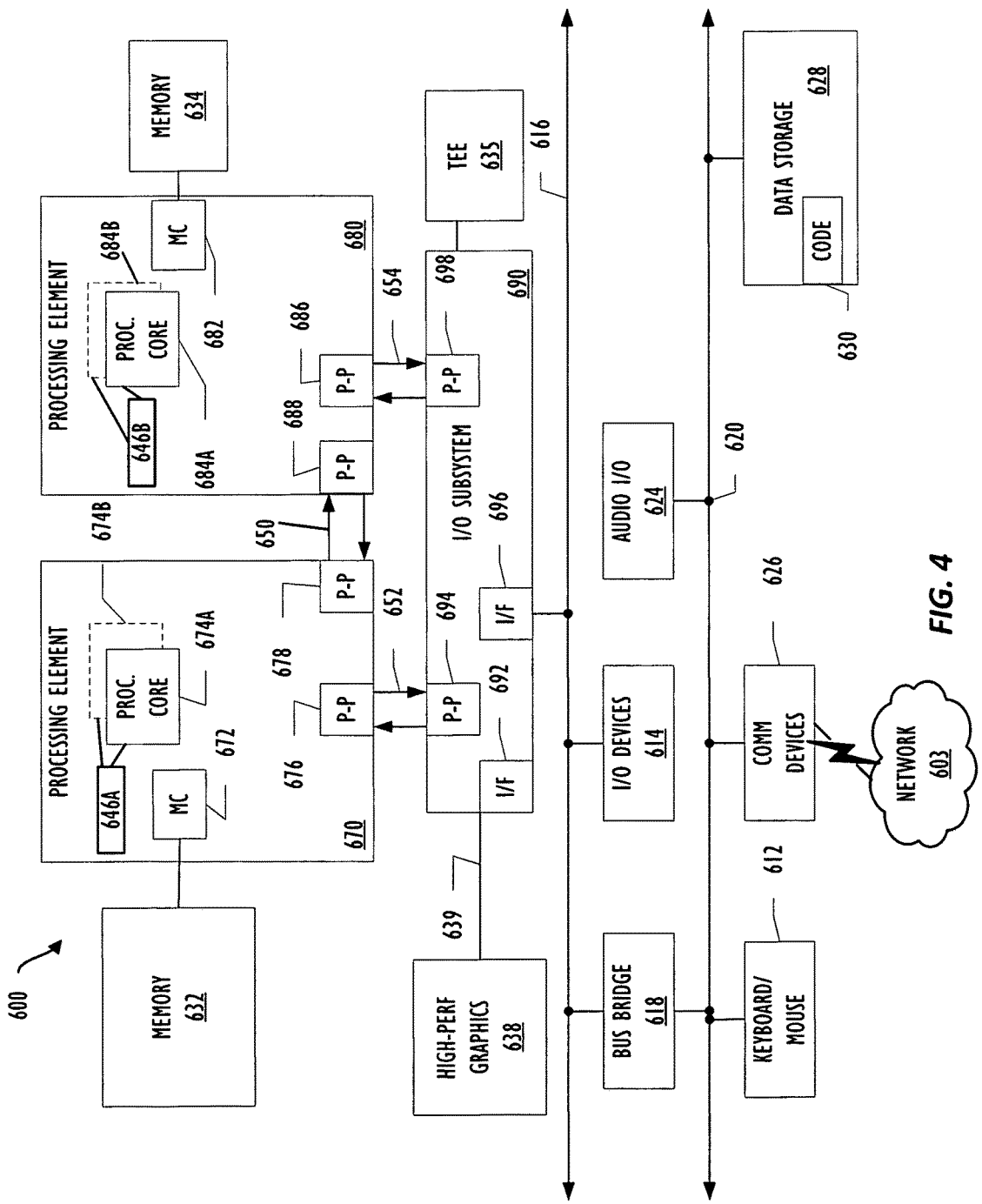
FIG. 4 is a diagram illustrating a computing device for use with techniques described herein according to one embodiment.

Referring now to FIG. 4, a block diagram illustrates a programmable device 600 that may be used within a trusted device, such as trusted device A 205, trusted device B 210, and trusted device C 215 in accordance with one or more embodiments. The programmable device 600 illustrated in FIG. 4 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 4 may be implemented as a multi-drop bus rather than point-to-point interconnects.

As illustrated in FIG. 4, each of processing elements 670 and 680 may be multicore processors, including first and second processor cores (i.e., processor cores 674a and 674b and processor cores 684a and 684b). Such cores 674a, 674b, 684a, 684b may be configured to execute instruction code in a manner similar to that discussed above in connection with FIGS. 1-3. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 4 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 6, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discrete logic outside processing elements 670, 680 rather than integrated therein.

Processing element 670 and processing element 680 and TEE 635 may be coupled to an I/O subsystem 690 via respective P-P interconnects 676 and 686 through links 652 and 654. As illustrated in FIG. 6, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 4, various I/O devices 614, 624 may be coupled to first link 616, along with a bridge 618 which may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second bus 620.

Note that other embodiments are contemplated. For example, instead of the point-to-point architecture of FIG. 4, a system may implement a multi-drop bus or another such communication topology. Although links 616 and 620 are illustrated as busses in FIG. 4, any desired type of link may be used. Also, the elements of FIG. 4 may alternatively be partitioned using more or fewer integrated chips than illustrated in FIG. 4.

Figure 5:
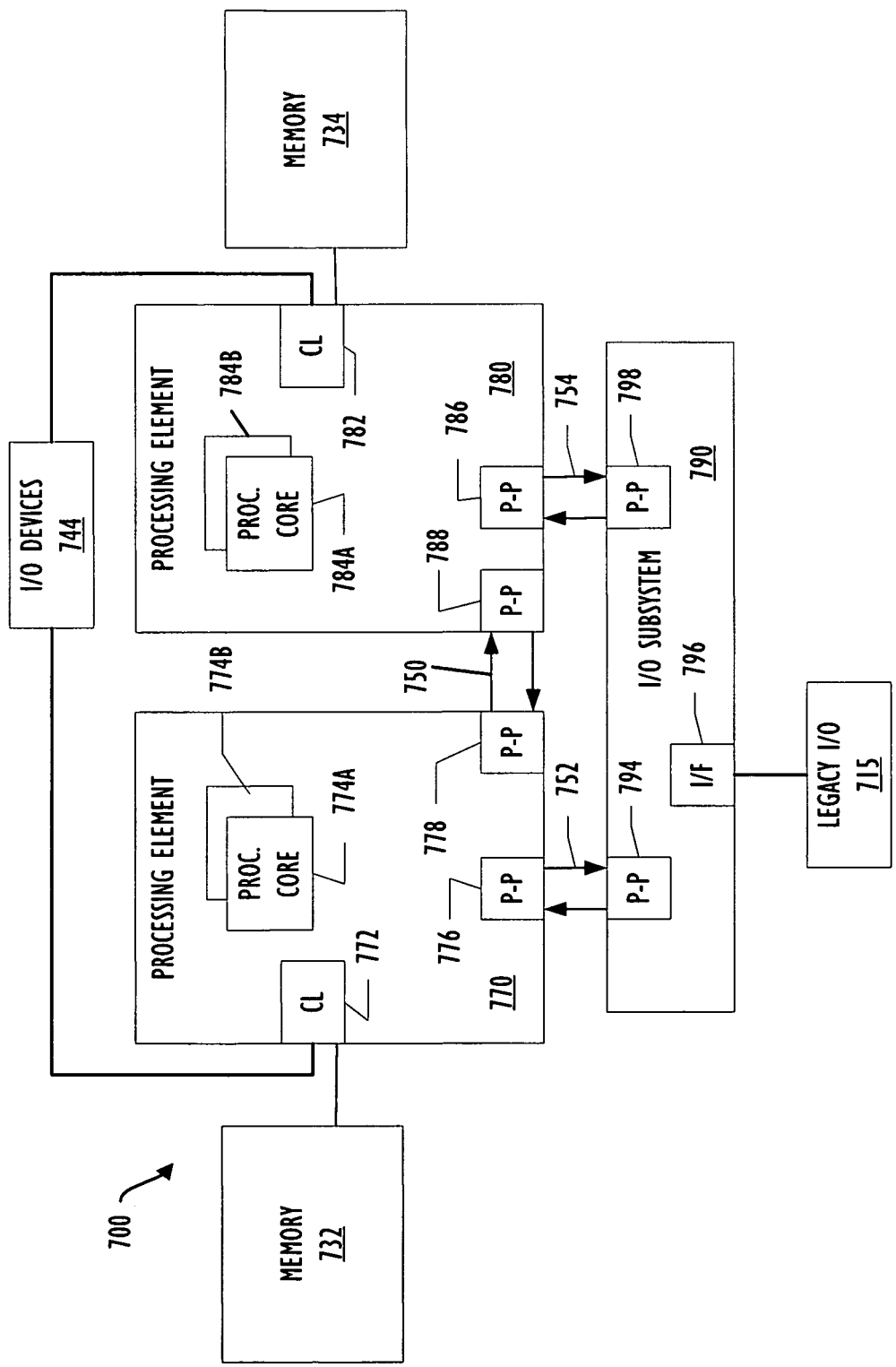
FIG. 5 is a block diagram illustrating a computing device for use with techniques described herein according to another embodiment.

Referring now to FIG. 5, a block diagram illustrates a programmable device 700 according to another embodiment. Certain aspects of FIG. 4 have been omitted from FIG. 5 in order to avoid obscuring other aspects of FIG. 5.

FIG. 5 illustrates that processing elements 770, 780 may include integrated memory and I/O control logic ("CL") 772 and 782, respectively. In some embodiments, the 772, 782 may include memory control logic (MC) such as that described above in connection with FIG. 4. In addition, CL 772, 782 may also include I/O control logic. FIG. 5 illustrates that not only may the memories 732, 734 be coupled to the 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 7 as processor cores 774A, 774B, 784A, and 784B. As illustrated in FIG. 7, I/O subsystem 790 includes P-P interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 4 and 5 are schematic illustrations of embodiments of programmable devices which may be utilized to implement various embodiments discussed herein. Various components of the programmable devices depicted in FIGS. 4 and 5 may be combined in a system-on-a-chip (SoC) architecture.

It is to be understood that the various components of the flowchart described above, could occur in a different order or even concurrently. It should also be understood that various embodiments of the inventions may include all or just some of the components described above. Thus, the flowcharts are provided for better understanding of the embodiments, but the specific ordering of the components of the flow chart are not intended to be limiting unless otherwise described so.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

Example 1 is a machine readable medium on which instructions are stored, comprising instructions that when executed cause a machine to: request a trusted execution environment to generate an encryption key and a certificate for a document, wherein the certificate comprises expiry information for the document and the encryption key; encrypt the document with the encryption key; transmit the certificate to a remote key manager; and transmit the document to a remote network storage device.

In Example 2 the subject matter of Example 1 optionally includes wherein the expiry information indicates a time after which decryption of the document is not allowed.

In Example 3 the subject matter of Example 1 optionally includes wherein the instructions that when executed cause the machine to request a trusted execution to generate an encryption key and a certificate for a document comprise instructions that when executed cause the trusted execution environment to generate the expiry information using a clock secured by the trusted execution environment.

In Example 4 the subject matter of any of Examples 1-3 optionally includes wherein the instructions that when executed cause the machine to request a trusted execution to generate an encryption key and a certificate for a document comprise instructions that when executed cause the trusted execution environment to generate the expiry information using a policy directed by the remote key manager.

In Example 5 the subject matter of any of Examples 1-3 optionally includes wherein the instructions that when executed cause the machine to encrypt the document with the encryption key in a general execution environment of the machine.

Example 6 is a machine readable medium on which instructions are stored, comprising instructions that when executed cause a machine to: obtain an encrypted document from a remote network storage device; obtain a certificate for the encrypted document from a remote key manager, the certificate comprising expiry information for the encrypted document and an encryption key, wherein the certificate was created in a trusted execution environment; determine, based on the expiry information, that decryption of the encrypted document is allowed; and in response to determining that decryption allowed, decrypt the encrypted document.

In Example 7 the subject matter of Example 6 optionally includes wherein the instructions further comprise instructions that when executed cause the machine to access a system clock to determine whether the expiry information indicates an allowed time to decrypt the encrypted document has expired.

In Example 8 the subject matter of Example 7 optionally includes wherein the system clock resides in a trusted execution environment on the machine.

Example 9 is a system for secure network storage, comprising: a trusted execution environment; one or more processors; and a memory, coupled to the one or more processors, on which instructions are stored comprising instructions which, when executed cause at least some of the one or more processors to: obtain an encrypted document; obtain a certificate for the encrypted document from a remote key manager, the certificate comprising expiry information for the encrypted document and an encryption key, wherein the certificate was created in a trusted execution environment; determine, based on the expiry information, whether decryption of the encrypted document is allowed; and in response to determining that decryption is allowed, decrypting the encrypted document.

In Example 10 the subject matter of Example 9 optionally includes wherein the instructions further comprise instructions that when executed cause at least some of the one or more processors to access a system clock to determine whether the expiry information indicates an allowed time to decrypt the encrypted document has expired.

In Example 11 the subject matter of Example 10 optionally includes wherein the system clock resides in the trusted execution environment.

Example 12 is a system for secure network storage, comprising: a trusted execution environment; one or more processors; and a memory, coupled to the one or more processors, on which instructions are stored comprising instructions which, when executed cause at least some of the one or more processors to: request a trusted execution environment to generate an encryption key and a certificate for a document, wherein the certificate comprises expiry information for the document and the encryption key; encrypt the document with the encryption key; transmit the certificate to a remote key manager; and transmit the document to a remote network storage device.

In Example 13 the subject matter of Example 12 optionally includes wherein the expiry information indicates a time after which decryption of the document is not allowed.

In Example 14 the subject matter of Example 12 optionally includes wherein requesting a trusted execution to generate an encryption key and a certificate for a document comprises generating the expiry information using a clock secured by the trusted execution environment.

In Example 15 the subject matter of any of Examples 12-14 optionally includes wherein requesting a trusted execution to generate an encryption key and a certificate for a document comprises generating the expiry information using a policy directed by the remote key manager.

Example 16 is a machine readable medium on which instructions are stored, comprising instructions that when executed cause a machine to: receive, from a first device, a certificate, wherein the certificate is associated with an encrypted document, and wherein the certificate comprises expiry information for the encrypted document and an encryption key, wherein the expiry information indicates a time after which decryption of the encrypted document is not allowed; receive, from a second device, a request for the certificate; and transmit the certificate to the second device in response to the request.

In Example 17 the subject matter of Example 16 optionally includes wherein the certificate was created in a trusted execution environment of the first device.

Example 18 is a method of encrypting a document, comprising: requesting a trusted execution environment of a programmable device to generate an encryption key and a certificate for a document, wherein the certificate comprises expiry information for the document and the encryption key; encrypting the document with the encryption key; transmitting the certificate to a remote key manager; and transmitting the document to a remote network storage device.

In Example 19 the subject matter of Example 18 optionally includes wherein the expiry information indicates a time after which decryption of the document is not allowed.

In Example 20 the subject matter of Example 18 optionally includes wherein requesting a trusted execution to generate an encryption key and a certificate for a document comprises generating the expiry information in the trusted execution environment using a clock secured by the trusted execution environment.

In Example 21 the subject matter of Example 18 optionally includes wherein requesting a trusted execution to generate an encryption key and a certificate for a document comprises generating the expiry information in the trusted execution environment using a policy directed by the key manager.

In Example 22 the subject matter of Example 18 optionally includes wherein encrypting the document with the encryption key comprises encrypting the document with the encryption key in a general execution environment of the programmable device.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Many other embodiment will be apparent to those of skill in the art upon reviewing the above description. The scope of the invention should therefore should be determined with reference to the appended claims, along with the full scope of equivalents to which such claims are entitled.

What is claimed is:

1. A machine readable storage device or storage disc comprising instructions which, when executed, cause a machine to at least:
   request, from a remote key manager in a second remote network storage device, (A) expiry information for an encrypted document and (B) an encryption key for the encrypted document, the expiry information and the encryption key associated with a certificate generated in a trusted execution environment, the certificate associated with a document identification of the encrypted document, the encrypted document from a first remote network storage device, the expiry information indicating a time period for which the encryption key is valid to perform a decryption operation on the encrypted document, the first remote network storage device being separate from the second remote network storage device, and (i) the encrypted document, (ii) the expiry information, and (iii) the encryption key associated with the document identification;
   in response to obtaining the expiry information and the encryption key, compare a current time to the time period of the expiry information to determine whether the decryption of the encrypted document is prohibited; and
   when the decryption is prohibited, prevent access to the encrypted document.

2. The machine readable storage device or storage disc of claim 1, wherein the instructions cause the machine to access a system clock to determine the current time.

3. The machine readable storage device or storage disc of claim 2, wherein the system clock resides in the trusted execution environment on the machine.

4. The machine readable storage device or storage disc of claim 1, wherein the instructions cause the machine to, when decryption is allowed, decrypt the encrypted document using the encryption key.

5. The machine readable storage device or storage disc of claim 1, wherein the instructions cause the machine to:
   prior to the request, determine the document identification of the encrypted document; and
   include the document identification in the request.

6. A system comprising:
   a general execution environment to request, from a remote key manager in a second remote network storage device, (A) expiry information for an encrypted document and (B) an encryption key for the encrypted document, the expiry information and the encryption key associated with a certificate generated in a trusted execution environment, the certificate associated with a document identification of the encrypted document, the encrypted document from a first remote network storage device, the expiry information indicating a time period for which the encryption key is valid to perform a decryption operation on the encrypted document, the first remote network storage device being separate from the second remote network storage device, and (i) the encrypted document, (ii) the expiry information, and (iii) the encryption key associated with the document identification; and the trusted execution environment to:
in response to obtaining the expiry information and the encryption key, compare a current time to the time period of the expiry information to determine whether decryption of the encrypted document is prohibited; and
when the decryption is prohibited, prevent access to the encrypted document.

7. The system of claim 6, wherein the trusted execution environment is to access a system clock to determine the current time.

8. The system of claim 7, wherein the system clock resides in the trusted execution environment.

9. The system of claim 6, wherein the general execution environment is to decrypt the encrypted document using the encryption key when the decryption is allowed.

10. The system of claim 6, wherein the general execution environment is to:
prior to the request, determine the document identification of the encrypted document; and
include the document identification in a request.

11. A method of encrypting a document, the method comprising:
requesting, from a remote key manager in a second remote network storage device, (A) expiry information for an encrypted document and (B) an encryption key for the encrypted document, the expiry information and the encryption key associated with a certificate generated in a trusted execution environment, the certificate associated with a document identification of the encrypted document, the encrypted document from a first remote network storage device, the expiry information indicating a time period for which the encryption key is valid to perform a decryption operation on the document, the first remote network storage device being separate from the second remote network storage device, and (i) the encrypted document, (ii) the expiry information, and (iii) the encryption key associated with the document identification;
in response to obtaining the expiry information and the encryption key, comparing a current time to the time period of the expiry information to determine whether decryption of the encrypted document is prohibited; and
when the decryption is prohibited, preventing decryption of the encrypted document.

12. The method of claim 11, further including accessing a system clock to determine the current time.

13. The method of claim 12, wherein the system clock resides in the trusted execution environment.

14. The method of claim 11, further including decrypting the encrypted document using the encryption key when the decryption is allowed.

15. The method of claim 11, further including:
prior to the requesting, determining the document identification of the encrypted document; and
including the document identification in a request.

* * * * *